United States Patent [19]

Vandevijver et al.

[11] Patent Number: 5,416,189
[45] Date of Patent: May 16, 1995

[54] PROCESS FOR THE SYNTHESIS OF POLYAMIDES

[75] Inventors: Eric Vandevijver, Brussels; Fernand Gauthy, Wemmel; Ardéchir Momtaz, Brussels, all of Belgium

[73] Assignee: Solvay (Société Anonyme), Brussels, Belgium

[21] Appl. No.: 145,208

[22] Filed: Nov. 3, 1993

[30] Foreign Application Priority Data

Nov. 4, 1992 [BE] Belgium .............................. 09200955

[51] Int. Cl.⁶ .............................................. C08G 69/26
[52] U.S. Cl. .................... 528/347; 528/335; 528/338; 528/339; 528/340; 528/346
[58] Field of Search ............... 528/347, 338, 339, 340, 528/335, 346

[56] References Cited

U.S. PATENT DOCUMENTS

| | | | |
|---|---|---|---|
| 2,130,947 | 9/1938 | Carothers | 528/335 |
| 2,130,948 | 9/1938 | Carothers | 528/335 |
| 2,840,547 | 6/1958 | Stump | 528/347 |

FOREIGN PATENT DOCUMENTS

| | | |
|---|---|---|
| 0071000A3 | 2/1983 | European Pat. Off. . |
| 0084661A1 | 8/1983 | European Pat. Off. . |

OTHER PUBLICATIONS

C. E. Schildknecht et al., Polymerization Processes, pp. 444 to 446, vol. XXIX of the series "High Polymers", Wiley Interscience Publication 1977. month of publication is not available.
Patent Abstracts of Japan, vol. 010, No. 043 (C-329), Feb. 20th, 1986; & JP-A-60 190 425 (Furukawa), Sep. 27th, 1985.

Primary Examiner—Samuel A. Acquah
Assistant Examiner—P. Hampton-Hightower
Attorney, Agent, or Firm—Spencer, Frank & Schneider

[57] ABSTRACT

Process for the synthesis of polyamides by polycondensation in a closed reactor of one or a number of dicarboxylic acids with a diamine compound containing not less than 60 mol % of-m-xylenediamine, in which all the amount of diamine compound stoichiometrically necessary for the polycondensation reaction is quickly brought into contact with the molten acid, the temperature of the reaction mixture is raised to a value greater than the melting point of the polyamide produced, the pressure is only allowed to rise to a value sufficient to prevent solidification of the reaction mixture and a substantial loss of diamine compound and, at the end of the reaction, the pressure of the reaction mixture is reduced and the polyamide formed is recovered.

7 Claims, No Drawings

PROCESS FOR THE SYNTHESIS OF POLYAMIDES

FIELD OF THE INVENTION

The present invention relates to a process for the manufacture of polyamides by a polycondensation reaction of a diaznine with a dicarboxylic acid. More particularly, the present invention relates to a process for manufacture in a closed reactor of a polyamide comprising the mixing of a molten dicarboxylic acid with a xylylenediamine and their direct reaction.

TECHNOLOGY REVIEW

Various processes for the manufacture of polyamides have already been proposed. Thus, a description has been given of the manufacture of polyamides by polycondensation of the acid with the diamine in an organic solvent [U.S. Pat. No. 2,130,948 (Du Pont)]. This process, however, poses problems of purification and of recycling of the organic solvent. It has also been suggested, in the same document, to mix the two solid monomers, to melt them and to react this mixture at high temperature and under autogenous pressure. This process has the disadvantage of leading to the varied melting of the two monomers, the melting points of which are different, as well as to reaction inhomogeneities, and thus to products possessing heterogeneous properties. Moreover, for reactors of industrial size, it is difficult and lengthy to obtain melting of the entire reaction medium.

It has also been proposed to prepare the polyamide by polycondensation of the salt formed from the acid and from the diaznine (known as "nylon salt") in the presence of a large amount of water [C. E. Schildknecht et al., Polymerization Processes, pages 444 to 446, Volume XXIX of the series "High Polymers", Wiley Interscience Publication, 1977, and U.S. Pat. No. 2,130,947 (Du Pont)]. According to this process, this water must be removed as well as that generated by the polyamidation reaction; this operation is lengthy and energetically expensive. Moreover, the volume occupied by the reaction mixture in the reactor is smaller at the end of the process than at the beginning, which leads to crusting on the walls of the reactor.

Another direct polycondensation process was described in U.S. Pat. No. 2,840,547 (Du Pont). According to this process, the acid and the diamine, after each has been separately melted, are mixed, in approximately equimolar proportions, at a temperature just sufficient to maintain the mixture in the molten state. The respective molar proportions of the diamine and of the acid are then exactly adjusted and the actual polymerization of the mixture is then carried out at a higher temperature. The implementation of this process is thus complicated since it requires the withdrawal of a sample, its analysis and the correction of the amounts of monomers introduced, before moving onto the polyamidation reaction under high temperature.

In the processes for the manufacture of polyamides mentioned above, the processes are carried out in a closed reactor, under high (autogenous) pressure, in order to keep diamine losses within acceptable limits. This implies that the equipment used is designed to resist both high pressures and then reduced pressures (in order to shift the polycondensation equilibrium towards higher molecular masses). As an example, the standard use of hexamethylenediamine requires that the equipment be able to withstand pressures of the order of 20 bar and then pressures generally less than atmospheric pressure, in order to produce higher molecular masses.

Recently, semi-aromatic polyamides resulting from the polycondensation of linear-chain aliphatic α,ω-dicarboxylic acids with xylylenediamines largely comprising the meta isomer of these diamines (subsequently known as "mXD", those obtained starting from adipic acid being in particular known as "mXD6") are arousing increasing interest taking into account the many advantages which these products have, especially a low water uptake conferring on them good size stability, high rigidity, good resistance to creep and advantageous dielectric properties.

Processes for the manufacture of these polyamides by a direct polycondensation reaction carried out at atmospheric pressure have been proposed [Patent Applications EP-A-0,071,000 and EP-A-0,084,661 (Mitsubishi Gas Chemical)]. These processes nevertheless have disadvantages. The diamine is introduced onto the molten acid according to a complex programme, linking the amount of amine introduced and its flow rate to the temperature reached by the reaction medium as a function of time. It is advisable to control the flow rate of introduction of the diamine so that the rate of the polyamidation reaction is always greater than the rate of introduction of the diamine, so that (a), at any time, there is only a small amount of free diamine capable of being entrained with the steam produced by the polyamidation reaction and (b) at no time is there any appearance of a foaming phenomenon. This restriction on flow rate thus implies that the introduction of the diamine is a stage which greatly extends the overall time of synthesis. Moreover, the water which is generated and which is evaporated during the polycondensation reaction must be separated from the reaction mixture by distillation through a complex system of primary and secondary condensers, the first of which is conditioned at a temperature close to 100° C., which complicates the equipment. Another disadvantage related to carrying out the process under atmospheric pressure is that it does not give access to the conventional molten "post-condensation" stage, generally carried out in continuous reactors offering long residence times under relatively high vacuums, in order to produce polyamides of very high molecular masses. In fact, the polyamides obtained by the polycondensation reaction with virtually stoichiometric amounts of acid and diamine under atmospheric pressure spontaneously move in the direction of high molecular masses and thus in the direction of high melt viscosities. Under these conditions, the above said continuous reactors in which the "post-condensation" is carried out are supplied with products whose melt viscosities increase with time, which leads to heterogenous final products.

The present invention is consequently targeted at providing a process for the manufacture of polyamides derived from a dicarboxylic acid and from a diamine constituent containing m-xylylenediamine by the direct polycondensation reaction which does not have the abovementioned disadvantages.

SUMMARY OF THE INVENTION

To this end, the invention relates to a process for the manufacture of polyamide by polycondensation, in a closed reactor, of a reaction mixture comprising a dicarboxylic acid or a mixture of such acids and a mixture of diamine compounds containing not less than 60 mol % of m-xylylenediamine, in which the acid is brought to a temperature at least equal to its melting temperature and which is characterized in that it additionally comprises the following stages:

(1) all the amount of mixture of diamine compounds stoichiometrically necessary for the polycondensation reaction is quickly brought into contact with the molten acid;
(2) the temperature of the reaction mixture is raised to a value greater than the melting point of the polyamide produced, the pressure is only allowed to rise to a value no greater than 10 bar and sufficient to prevent the solidification of the reaction mixture and a substantial loss of diamine compounds, and
(3) the pressure in the reactor is reduced and the polyamide formed is recovered.

This process in particular offers the following advantages, which will be expanded on subsequently:

it leads to a very low amount of crusting and a saving in energy with respect to the known processes;
the maximum pressure is moderate, which makes it possible to use inexpensive equipment;
the acid and the diamine are both mixed in the liquid form, guaranteeing the homogeneity of the product;
the introduction of the dismine is very quick, resulting in a saving in time and an improvement in productivity;
yellowing of the polymers is less.

DETAILED DESCRIPTION OF THE INVENTION

The dicarboxylic acid which can be used for the process according to the invention (hereinafter called more simply "acid") is generally a linear-chain aliphatic $\alpha, \omega$-dicarboxylic acid containing from 4 to 12 carbon atoms, which can be represented by the formula $HOOC-(CH_2)_n-COOH$ in which $2 \leq n \leq 10$. Examples of acids which can be used are glutaric, adipic, pimelic, suberic, azelaic, sebacic, undecanedioic and dodecanedioic acids. Adipic acid is preferred. It is, however, also possible to use alicyclic or aromatic dicarboxylic acids, such as for example cyclohexanedicarboxylic, isophthalic acid or terephthalic acid. Mixtures of the abovementioned acids can also be used. When the melting temperature of the acid or of the acid mixture chosen exceeds approximately 230° C., it is generally preferable to add one or a number of other acids to this acid or to this mixture of acids so that the melting temperature of this new mixture does not exceed approximately 230° C.

The mixture of diamine compounds which can be used for the process according to the invention (hereinafter called more simply "dismine") contains not less than 60 mol % of m-xylylenediamine. It can also consist solely of m-xylylenedismine. Other dismines which can be used in combination with m-xylylenedismine can be chosen from aliphatic dismines, such as tetramethylenediamine, pentamethylenediamine, hexamethylenediamine and octamethylenedismine, for example; aliphatic dismines containing an aromatic ring other than m-xylylenediamine, such as p-xylylenedismine for example; aromatic dismines, such as p-phenylenediamine for example; alicyclic diamines, such as 1,3-bisaminomethylcyclohexane and 1,4-bisaminomethylcyclohexane for example. The mixture of dismine compounds preferably contains more than approximately 70 mol % of m-xylylenediamine, which makes it possible to use a lower operating pressure during the polycondensation, in view of the lower risk of solidification in this case.

The acid or the mixture of acids is brought to a temperature where it becomes liquid. To this end, the amount of acid necessary, accurately measured by weighing beforehand or by any other known measuring means, is introduced into a reactor equipped with conventional heating and stirring means, which is closed. Melting of the acid can be carried out directly in the reactor where the polycondensation will take place, which simplifies the equipment required; it is also possible to carry it out in an additional heating reactor different from the polycondensation reactor, which makes it possible to shorten the duration of the manufacturing cycles. Stabilizing agents and various adjuvants, such as anti-foaming agents for example, can be introduced into the reactor at the same time as the acid. While it is generally sufficient, as mentioned above, to reach at least the melting temperature of the acid, it is preferable to reach a temperature sufficient to prevent subsequent solidification; the temperature will thus be chosen according to the nature of the acid and of the diamine used, to the capacity of the reactor, and to the melting point and crystallizability of the polyamide manufactured. In the specific case of the synthesis of mXD6, this temperature is adjusted to approximately between 160° C. and 230° C., preferably between 170° and 180° C.

Once the molten acid has been introduced into the polycondensation reactor, the introduction of the diamine, in the liquid state, is carried out according to Stage (1) of the process. Due to the increase in pressure resulting from the polycondensation, which is displayed from the beginning of the introduction of the diamine, the use of a pump or of another introduction device is necessary.

A first essential characteristic of this stage is that the amount of diamine introduced is exactly that which is stoichiometrically required for the reaction. For this purpose, the diamine is carefully measured, for example by weighing or by any other known measuring means, so that the acid/diamine molar ratio is as close a possible to unity. Small deviations can, however, be tolerated; for example, it will be accepted that this molar ratio is approximately between 0.995 and 1.005. Such a very accurate initial measuring of the acid and of the diamine avoids the need to measure and readjust the concentrations of the reactants during the reaction.

A second essential characteristic of this stage is that all the diamine required is introduced quickly into the reactor, in contrast to the known processes where it was necessary to carry out this introduction very progressively, which, in certain cases, took of the order of 50% of the overall reaction time, i.e. several hours on an industrial scale. "Quickly" is understood to specify, in the context of the present invention, that the time dedicated to the introduction of the diamine represents less than approximately 25% of the overall time of the polycondensation reaction. This time is preferably less than 10% of the overall time and, in a particularly preferred way, less than 5%. Lower introduction times can be used, and are even more advantageous from the profitability viewpoint, but it would, however, be unreasonable to use introduction devices (valves, pumps, piping, and the like) which are out of the ordinary solely for the purpose of providing for ultra-quick introduction of the diamine. In concrete terms, during the use of the process according to the invention under industrial conditions, the time of introduction of the diamine is generally of the order of a few minutes, for example from 5 to 10 minutes, whereas the overall duration of the synthesis reaction can be of the order of a few hours, for example 3 hours. These values are only illustrative and naturally depend on the amounts synthesized, on the equipment used, and the like.

The polycondensation reaction which takes place in Stage (2) is initiated from the beginning of the introduction of the diamine, with the consequence of an increase in the pressure. The reactor is, however, equipped with regulating device such as a pressure relief valve (connected to a condenser) which restricts the pressure to a maximum value. This maximum pressure, which is in all cases greater than atmospheric pressure, is generally not greater than approximately 10 bar, preferably less than 6 bar. This maximum pressure is chosen so as to avoid (a) solidification of the polymer under the effect of an excessive degree of polymerization, (b) foaming due to an excessive high reaction rate, and (c) excessively diamine losses by evaporation and entrainment by the steam in the direction of the condenser. In the specific case of the synthesis of mXD6, a maximum pressure of the order of 3 to 4 bar gives excellent results. This maximum pressure is markedly less than that used in the known processes for synthesis under pressure, generally of the order of 15 to 20 bar as mentioned above, which makes it possible to use a less expensive reactor. In order to avoid solidification of the polymer, blocking the reactor, it is additionally important to bring the temperature of the reaction mixture to, and to maintain it at, a value at least equal to the melting temperature of the polymer synthesized. This rise in temperature can begin at any time during the period of introduction of the diamine; it is preferable, however, to make it begin from the beginning of the introduction of the diamine. Stages (1) and (2) as defined above are therefore not inevitably separated in time.

Once the polycondensation phase under pressure has finished, it is possible to leave the pressure to fall to atmospheric pressure (Stage 3). The consequence of this is a shift in the reaction equilibrium which leads to an increase in the mean molecular mass of the polymer synthesized. An even more significant increase in the molecular mass can be obtained by then reducing the pressure of the reaction mixture to a pressure less than atmospheric pressure. This operation can be carried out in the polycondensation reactor or in a separate additional pressure-reducing reactor better suited to discharging highly viscous product (film evaporator, continuous screw reactor, and the like). The development of the molecular mass can be assessed indirectly by measuring the torque exerted on the stirrer of the reactor or by measuring the stirring power. The rate of pressure reduction must be restricted in order to avoid any foaming problems; however, it was observed that rates of pressure reduction of the order of 30 to 40 bar to the hour did not lead to any particular problem.

During this pressure-reduction stage, the temperature can optionally be raised in order to reach a sufficient temperature for a subsequent granulation stage. This granulation can be carried out particularly conveniently if the reactor (in which the pressure reduction takes place) is equipped with a bottom valve equipped with a die: an excess nitrogen pressure at the time of emptying then forces the polymer through this die at a suitable rate for the formation of rods which can be cut into granules.

The polymers obtained by the process of the invention have characteristics very close to those of those resulting from the known processes; a notable difference is the yellowing index, markedly lower in the case of the process of the present invention, which probably reflects a lower thermo-oxidative degradation of the polymer.

EXAMPLES

Example 1

Synthesis of mXD6 according to the process of the invention 13737 g of adipic acid are introduced into a 50 litre reactor equipped with a stirrer and with heating by a double jacket containing circulating oil and the temperature of the adipic acid is progressively brought to a temperature of 170° C. so as to cause it to melt. At this point, 12783 g of m-xylylenediamine, liquid at room temperature, are introduced into the reactor by means of a membrane pump. This introduction takes 6 minutes. The amount of diamine is accurately measured by the loss in weight of the introduction drum placed on an accurate industrial balance. The pressure prevailing in the reactor, which increases from the beginning of the introduction of the diamine, is kept below 4 bar by means of a needle valve followed by a total condenser which makes it possible to collect the water formed by the reaction. The temperature of the reaction medium is brought to 245° C., i.e. above the melting temperature of the polymer. The pressure of the reactor is then progressively relaxed and reaches atmospheric pressure after approximately 8 minutes. A slight negative pressure (0.8 bar) is then maintained for 10 minutes in order to completely degas the medium and optionally to shift the equilibrium in the direction of the high molecular masses still more than by reducing the pressure to atmospheric pressure. During these two pressure-reducing stages, the temperature was brought from 245° to 260° C. The product is then extracted from the reactor via the bottom valve and granulated, with the help of an excess nitrogen pressure.

The polymer thus collected has a (number-)average molecular mass of 15200 g/mol (determined via its viscosity in concentrated sulphuric acid as described in Patent EP 71000, p. 9, 1. 9) and a yellowing index (measured on an Ultrascan ® colorimeter according to ASTM Standard D 1925–77) of 0.1. The overall duration of the operations, from the beginning of the melting of the adipic acid to the beginning of the granulation, is 3 hours 30 minutes.

Comparative Example 2

Synthesis of mXD6 at atmospheric pressure

This example is carried out by using the process described in Patent EP 84661, using the same 50 litre reactor as in Example 1 above, with a partial condenser at 100° C. and with a total condenser which is connected to it. This process takes place under atmospheric pressure.

An amount of adipic acid of 13737 g is introduced in the solid form into the reactor and melted with stirring and nitrogen purging. The temperature is brought to 175° C. The methylenediamine, contained in an introduction drum placed on an accurate industrial balance, is then added dropwise, with stirring, while the temperature of the reaction medium is progressively brought to 245° C. 11487 g of diamine are added in total. The water formed by the reaction is removed as it is formed through the condensers. The introduction of the diamine is carried out over 3 hours 30 minutes, in order to avoid foaming and to restrict diamine losses by entrainment into the condensers. The temperature is then brought to 260° C., over 1 hour. During this time, an additional amount of diamine of 1276 g is introduced into the reactor. The reaction is continued for 30 minutes at atmospheric pressure and then under a slight negative pressure to bring the manufacturing to an end as in Example 1 above.

The (number-)average molecular mass of the polymer collected is 15400 g/mol and its yellowing index is 8. The overall duration as defined in Example 1 is 6 hours.

We claim:

1. A process for synthesis of a polyamide, in a closed reactor, comprising:
providing a reaction mixture in said closed reactor comprising (a) a diacid component comprising at least one dicarboxylic acid, and (b) a substantially stoichiometric amount of a diamine component comprising at least 60 mol % of m-xylylenediamine,
heating said diacid component to at least the melting point thereof to produce a molten diacid component,
adding all of said diamine component to the molten diacid component, in a time less than 25% of the overall time from beginning the addition of said diamine component to recovering polyamide, to produce a polyamide and raising the reaction mixture to a temperature greater than the melting point of the polyamide produced,
allowing the pressure in said reactor to rise to a value greater than atmospheric pressure and no greater than 10 bar,
reducing pressure in said reactor, and recovering polyamide.

2. A process for synthesis of a polyamide, in a closed reactor, comprising:
providing a reaction mixture in said closed reactor comprising (a) a diacid component comprising at least one dicarboxylic acid, and (b) a substantially stoichiometric amount of a diamine component comprising at least 60 mol % of m-xylylenediamine,
heating said diacid component to at least the melting point thereof to produce a molten diacid component,
adding all of said diamine component to the molten diacid component, in a time less than 25% of the overall time from beginning the addition of said diamine component to recovering polyamide, to produce a polyamide and raising the reaction mixture to a temperature greater than the melting point of the polyamide produced,
allowing the pressure in said reactor to rise to a value greater than atmospheric pressure and no greater than 10 bar,
reducing pressure in said reactor, further reducing pressure below atmospheric pressure in a separate reactor, and recovering polyamide.

3. The process according to claim 1, in which said diamine component is introduced into the reactor in a time less than 10% of the overall time from beginning the addition of said diamine component to recovering said polyamide.

4. The process according to claim 1, in which said diamine component is introduced into the reactor in a time less than 5% of the overall time from beginning the addition of said diamine component to recovering said polyamide.

5. The process according to claim 1, in which the acid is a linear-chain aliphatic $\alpha$-$\omega$-dicarboxylic acid containing from 4 to 12 carbon atoms.

6. The process according to claim 5, in which the acid is adipic acid.

7. The process according to claim 1, including reducing said reactor pressure below atmospheric pressure, to obtain a polyamide of high molecular mass.

* * * * *